(12) United States Patent
Radermacher (10) Patent No.: US 7,458,403 B2
(45) Date of Patent: Dec. 2, 2008

(54) TOOL STAND WITH SUPPORT FRAME

(75) Inventor: Uwe Radermacher, Weibern (DE)

(73) Assignee: Wolfcraft GmbH (DE)

( * ) Notice: Subject to any disclaimer, the term of this patent is extended or adjusted under 35 U.S.C. 154(b) by 0 days.

(21) Appl. No.: 10/503,172

(22) PCT Filed: Jan. 27, 2003

(86) PCT No.: PCT/EP03/00773

§ 371 (c)(1),
(2), (4) Date: Mar. 14, 2005

(87) PCT Pub. No.: WO03/064115

PCT Pub. Date: Aug. 7, 2003

(65) Prior Publication Data

US 2005/0194215 A1 Sep. 8, 2005

(30) Foreign Application Priority Data

Jan. 30, 2002 (DE) ................................ 102 04 417

(51) Int. Cl.
*B25H 1/00* (2006.01)

(52) U.S. Cl. ............... 144/286.1; 144/287; 83/471; 83/477.2

(58) Field of Classification Search ............... 144/287, 144/286.5, 286.1; 083/471, 477.2; 269/901, 269/97, 139, 16, 220, 283; 280/47.131, 47.19, 280/47.34, 47.35, 635, 638–640; 108/147.19, 108/147.2, 147.22, 129–133
See application file for complete search history.

(56) References Cited

U.S. PATENT DOCUMENTS

| 4,133,360 | A | * | 1/1979 | Sanfilippo et al. | ......... 144/286.1 |
| 4,341,247 | A | * | 7/1982 | Price | ............................ 144/287 |
| 4,483,573 | A | * | 11/1984 | Keller | ......................... 312/281 |
| 4,617,869 | A | * | 10/1986 | Denomey | .................... 108/132 |
| 4,860,807 | A |   | 8/1989 | Vacchiano |  |
| 4,964,449 | A | * | 10/1990 | Conners | .................. 144/286.1 |
| 5,004,029 | A | * | 4/1991 | Garner | ........................ 144/287 |
| 5,119,903 | A |   | 6/1992 | Ulshafer, Jr. |  |
| 5,135,036 | A | * | 8/1992 | Caron | ...................... 144/286.5 |
| 5,193,598 | A | * | 3/1993 | Estrem | ........................ 144/287 |
| 5,273,090 | A | * | 12/1993 | Klemma | ................... 144/136.9 |
| 5,320,150 | A | * | 6/1994 | Everts et al. | ................. 144/287 |
| 5,421,231 | A | * | 6/1995 | Break et al. | ................. 83/471.3 |
| 5,526,856 | A | * | 6/1996 | Pedri | ........................... 144/287 |

(Continued)

FOREIGN PATENT DOCUMENTS

DE 10303115 8/2003

(Continued)

*Primary Examiner*—Bena Miller
(74) *Attorney, Agent, or Firm*—Bell, Boyd & Lloyd LLP (57) ABSTRACT

A folding stand (1) for a cross-cut saw or the like, has an elongate carrying body (4) for a cross-cut saw, at the ends of which two legs (3) are hinged. The legs pivot from a storage position, in which they are placed parallel to the carrying body (4), into an operating position, in which they are placed in a trapezoidal position relative to each other. The cross-cut saw is detachably fixed to the carrying body (4). The carrying body (4) is configured as a frame (4), while the fixing device forms brackets (5, 5', 5") interacting with the frame.

20 Claims, 6 Drawing Sheets

U.S. PATENT DOCUMENTS

| | | | |
|---|---|---|---|
| 5,542,639 A * | 8/1996 | Wixey et al. | 248/439 |
| 5,579,672 A * | 12/1996 | Findlay | 83/468 |
| 5,592,981 A * | 1/1997 | Derecktor | 144/286.1 |
| 5,664,612 A * | 9/1997 | Klemma | 144/286.1 |
| 5,681,034 A * | 10/1997 | Noniewicz | 269/139 |
| 5,778,953 A * | 7/1998 | Braddock | 144/286.1 |
| 5,782,279 A * | 7/1998 | Stecker, Sr. | 144/286.1 |
| D399,977 S | 10/1998 | Laga | |
| 5,836,365 A * | 11/1998 | Derecktor | 144/287 |
| 5,884,681 A * | 3/1999 | Nickles | 144/329 |
| 5,988,243 A * | 11/1999 | Ayala et al. | 144/329 |
| 6,019,193 A | 2/2000 | Brown | |
| 6,089,555 A * | 7/2000 | Lin | 269/139 |
| 6,745,804 B2 * | 6/2004 | Welsh et al. | 144/287 |
| 7,055,563 B2 * | 6/2006 | Logan | 144/287 |
| 2004/0250901 A1 * | 12/2004 | Ursell et al. | 144/286.1 |
| 2004/0250903 A1 | 12/2004 | Welsh | |

FOREIGN PATENT DOCUMENTS

| | | |
|---|---|---|
| EP | 214785 A1 * | 3/1987 |
| GB | 2190618 A * | 11/1987 |
| GB | 2202483 A * | 9/1988 |
| GB | 2208071 A * | 2/1989 |
| GB | 2264257 A * | 8/1993 |

* cited by examiner

TOOL STAND WITH SUPPORT FRAME

PRIORITY CLAIM

The present application is a continuation in part of German patent application no. 10204417.1 filed on Jan. 30, 2002, and International application no. PCT/EP03/00773 filed on Jan. 27, 2003, the entire disclosures of which are herein incorporated by reference.

CROSS REFERENCE TO RELATED APPLICATIONS

The present application relates to the following commonly-owned pending patent application, U.S. patent application Ser. No. 11/118,606 filed on Apr. 29, 2005.

BACKGROUND OF THE INVENTION

The invention relates to a folding stand. In embodiments, the present invention can be used for a cross-cut saw or the like. In an embodiment, the folding stand has an elongate carrying body which is intended for a cross-cut saw and on which two legs are articulated at each of the ends, it being possible for these legs to be pivoted from a storage position, in which they are located parallel to the carrying body, into a use position, in which they are located trapezoidally in relation to one another, and it being possible for the cross-cut saw to be mounted, in particular in a releasable manner, on the carrying body by securing means.

A folding cross-cut saw stand is described in U.S. Pat. No. 5,119,903. The carrying body here is formed by a trapezoidal box which has in its interior, at each of its ends, articulations on which legs are secured, it being possible for these legs to be pivoted out into a use position, in which the legs are located trapezoidally in relation to one another, from a storage position, in which the legs have been pivoted into the box. In the use position, the carrying body is spaced apart from the underlying surface by a distance which is determined substantially by the length of the legs. The legs can latch with the carrying body in the storage position and in the use position.

A cross-cut saw may be fastened on the surface of the carrying body.

A similar stand is described in U.S. Pat. No. 3,999,777. This stand also has a carrying body from which legs project trapezoidally in the use position.

SUMMARY OF THE INVENTION

It can be an advantage in embodiments of the invention to develop a stand in a straightforward manner in production terms.

In embodiments of the present invention, a folding stand has one or more of the following features, including a carrying body which is a frame and the securing means comprises brackets interacting with the frame. The frame may be a tubular frame which is formed by at least two tubes running parallel to one another. These tubes may have a quadrilateral profile. The tubes are connected to one another at their ends in each case by connecting components. These connecting components form cross-members which provide the pivot bearings for the legs. In the storage position, the legs, which are likewise formed by quadrilateral tubes, are located parallel to the tubes of the frame. The brackets, of which preferably two are provided, engage through the frame interspace by way of their clamping means, which may be screws. A pressure-exerting component in the form of a strip, which is disposed on the underside of the frame, can be braced against the bracket located on the frame surface. Like the pressure-exerting strip, the bracket is preferably formed by a punched and bent part. It is possible for the pressure-exerting strip to form a U-shaped component with U-crosspieces projecting into the frame interspace, in order thus to ensure that the bracket is fixed in position. The bracket may also have a crosspiece portion which projects into the frame interspace. This ensures that an engagement edge of the bracket, which is formed on the clamping side, runs substantially transversely to the direction in which the frame extends. This engagement edge can engage in a groove of the carrying plate which is to be secured on the top side of the frame, and on which the cross-cut saw can be mounted. The base of the cross-cut saw can preferably be fastened on two carrying plates. Each of these carrying plates can be secured on the frame by a bracket. As a result of the groove/engagement-edge guidance, the carrying plate can be displaced transversely to the direction in which the frame extends. The brackets themselves can be displaced in the direction in which the frame extends, so that it is possible for the entire cross-cut saw not just to be removed from the frame, but also to be adjusted on the frame in the manner of a compound table. The frame preferably has two tubes which are located one beside the other, and are preferably even in contact, in which draw-out extensions are inserted. These extensions may be as long as the tubes accommodating them, so that telescopic association is possible. The extensions can be fixed in their respective extended positions. Clamping screws, for example, are provided for this purpose. In each case one workpiece support is located at the end of the extension. These workpiece supports are height-adjustable. For this purpose, a tubular guide portion is provided at the end of the tubular extension, a tubular portion of the workpiece carrier being inserted in this guide portion, and it likewise being possible for this workpiece carrier to be secured to the guide by means of a clamping screw. The free end of the supporting tube carries a shoulder which is formed by a sheet-metal component bent in a U-shaped manner. The portion of this shoulder on which the workpiece comes to rest is rounded. There is T-shaped association with the supporting tube. The T-shaped sheet-metal component can be pivoted stiffly over a small region about its securing pin in relation to the supporting tube. The supporting tube has an opening into which an angled, strong wire is inserted. The rotary position of the wire is predetermined as a result of the wire being flattened on one side and of a corresponding configuration of the opening and/or of a clamping screw which acts against the flattened portion. A free portion of the wire forms a length/width stop. This free portion projects beyond the supporting shoulder, which carries the workpiece. The free end can be displaced transversely to the direction in which the extension extends and can be fixed in position by the said screw. Further workpiece carriers can also be located at the end of the carrying body. Like the workpiece carriers described above, they may be secured to a tube. They are then secured to a frame-forming tube. For this purpose, a portion of the tube in question can project beyond the cross-member. The legs may be height-adjustable. For this purpose, it is possible for extensions to be drawn telescopically out of the legs. Furthermore, it is provided that at least one pair of legs carries rollers which, in the use position, are spaced apart from the set-down surface and, in the storage position, are oriented downward, so that the folded cross-cut saw stand can be transported via the rollers. The legs can latch in the region of their rotary bearings both in the storage position and in the use position. Spring-activated latching protuberances are provided for this purpose, these being formed by the ends of latching pins which are inserted in a spring-biased state in bores of the tubular leg and have their heads entering into latching cutouts of the cross-members.

Additional features and advantages of the present invention are described in, and will be apparent from, the following Detailed Description of the Invention and the figures.

BRIEF DESCRIPTION OF THE FIGURES

An exemplary embodiment of the invention is explained hereinbelow with reference to accompanying figures, in which.

DETAILED DESCRIPTION OF THE INVENTION

The cross-cut saw stand 1 serves for accommodating a cross-cut saw or the like. For this purpose, the stand 1 has a carrying body 4 which is formed by a frame. The frame surface is located in a horizontal plane. One or more carrying plates 6 or tool mounting base may be positioned on the frame, which is formed substantially by two tubes 2, 2' and 2". In the exemplary embodiment, two carrying plates 6 rest on the frame.

The base of a cross-cut saw can be mounted securely on the carrying plates 6, for which purpose the base is connected, for example by screws, to the carrying plates. It is thus possible to use the cross-cut saw both together with the stand 1, if it is fastened on the carrying plates, and without the stand 1, for example on the floor.

The carrying plates 6 are fixed on the carrying body 4 by brackets 5. For this purpose, each of the two carrying plates 6 has a groove 9 running transversely to the longitudinal extent of the carrying body 4. An engagement edge 10 of the bracket 5, which is formed as a punched and bent part, engages in this groove 9. This ensures that the carrying plate 6 can be displaced transversely when the bracket 5 is released. On the other hand, the bracket 5 can be guided in the frame 4 transversely to the direction in which the groove 9 extends. For this purpose, the bracket 5, which is substantially trapezoidal, has a rear crosspiece 5' which, although still resting on the frame legs 2, continues centrally into a narrower crosspiece portion 5" which engages in the frame interspace 8. The abutment of bracket 5 is provided by a pressure-exerting strip 7, which presses from beneath against the frame legs 2, 2', 2". The pressure-exerting strip 7 is also formed as a punched and bent part. The pressure-exerting strip 7 has a substantially U-shaped profile, the two U-crosspieces projecting into the frame interspace 8 and having a width which corresponds to the clear width between the frame legs 2, 2', 2". The pressure-exerting strip 7 is connected to the bracket 5 via a clamping screw (not illustrated in the drawings). The clamping screw engages through the bracket approximately centrally, that is between the crosspiece 5', which rests in certain regions on the frame leg 2, 2', 2", and the engagement edge 10, so that the necessary retaining force can be applied.

The two frame legs 2, 2', 2" are connected to one another by cross-members 18. The cross-members 18 are located at the respective ends of the frame leg 2, which is formed by a quadrilateral tube.

The frame leg which is spaced apart from the frame leg 2 by the frame interspace 8 is formed by two parallel tubes 2', 2" in contact with one another. These two tubes contain extensions 12 which, like the tubes holding them, have a quadrilateral profile. The extensions 12 can be drawn out of the tubes 2', 2" and fixed in these positions by clamping screws (not illustrated).

At the respective end, each extension 12 carries a tube portion 13 with a vertically running axis. This tube portion 13 forms a support carrier. A tubular workpiece support carrier 14 is inserted in this support carrier 13. A U-profiled metal sheet is located at the upper end of the workpiece support carrier 14. This U-profiled metal sheet forms a workpiece carrier 22, the upper edge of which forms a rounded carrying shoulder 16. The height of the carrying shoulder 16 can be produced by vertical displacement of the workpiece support carrier 14 in the support carrier 13. Here too, a clamping screw (not illustrated) can provide an arresting action. The U-profiled metal sheet 22 is connected to the workpiece support carrier 14 by means of a connecting screw, so that it is possible to adjust the tilting position of the carrying shoulder 16 within a small range. The tilting displacement takes place stiffly.

The workpiece support carrier 14 contains an opening in the horizontal direction. A stiff wire 15 which is bent twice through 90° in each case is inserted into this opening. In order to fix the rotary position of the wire, the end of the latter which is inserted into the opening of the workpiece support carrier has a flattened portion, against which a clamping screw can be clamped. For fixing the rotation, the corresponding opening may also have a contour adapted to the cross-sectional profile of the wire. A portion of the wire 15 projects beyond the carrying shoulder 16 and forms a stop for the workpiece. This stop 15 can perform both the function of a length stop and the function of a width stop, depending on the horizontal position in which it is secured by displacement of the non-round wire portion inserted into the opening of the workpiece support carrier 14. The length adjustment of the stop 15 takes place by displacement of the extension 12 in the tube 2', 2" which carries it.

Further workpiece supports are located at the ends of the respective tubes 2', 2", these further workpiece supports likewise being associated with a support carrier 13 in a height-adjustable manner by a workpiece support carrier 14 and, in a previously described manner, having a U-profile with a rounded crosspiece as carrying shoulder 16.

Figure 1:
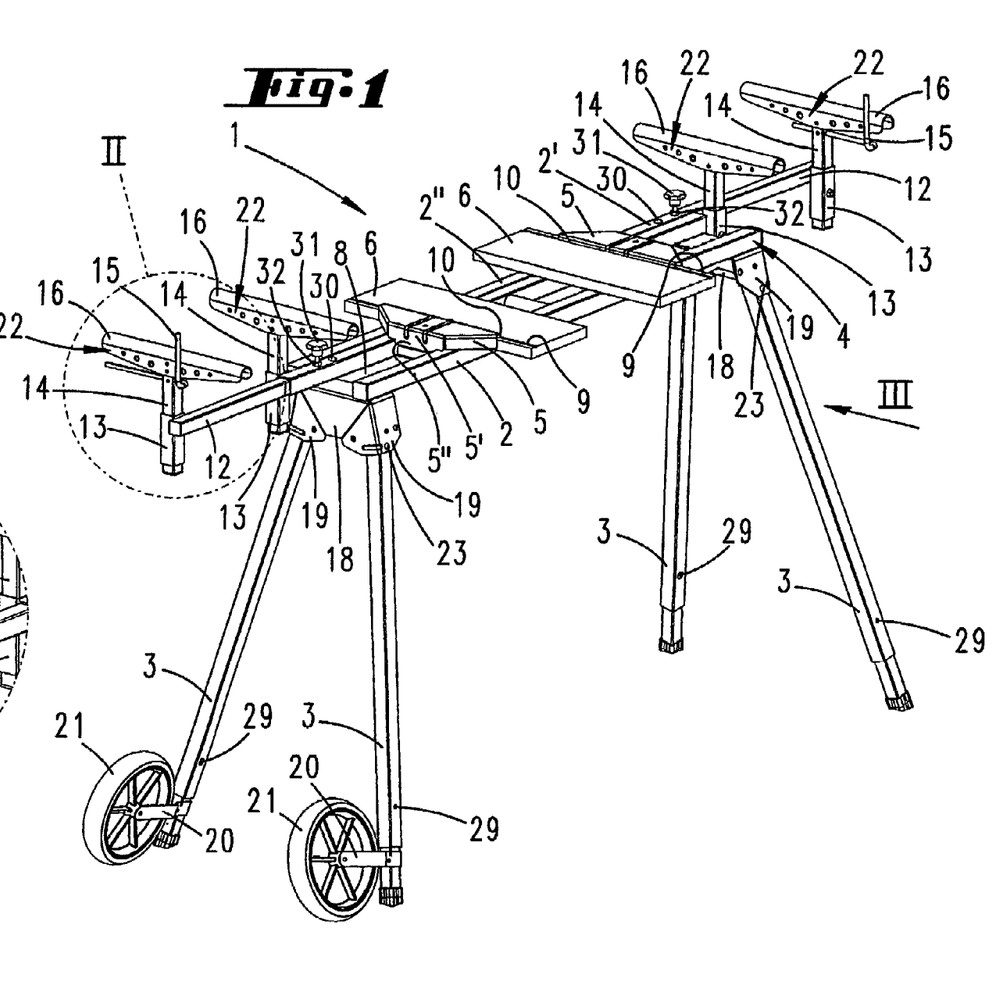
FIG. 1 shows a perspective illustration of the exemplary embodiment of the invention.
Figure 2:
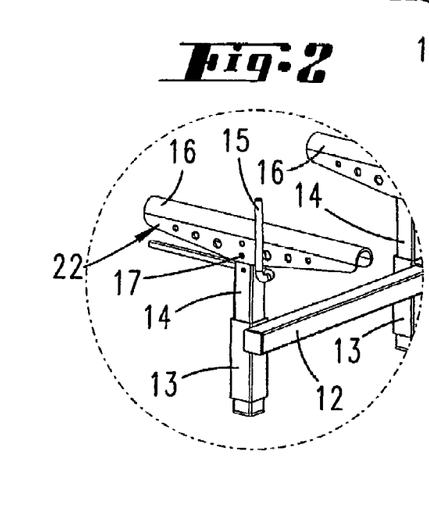
FIG. 2 shows an enlarged detail of the region designated II in FIG. 1.
Figure 3:
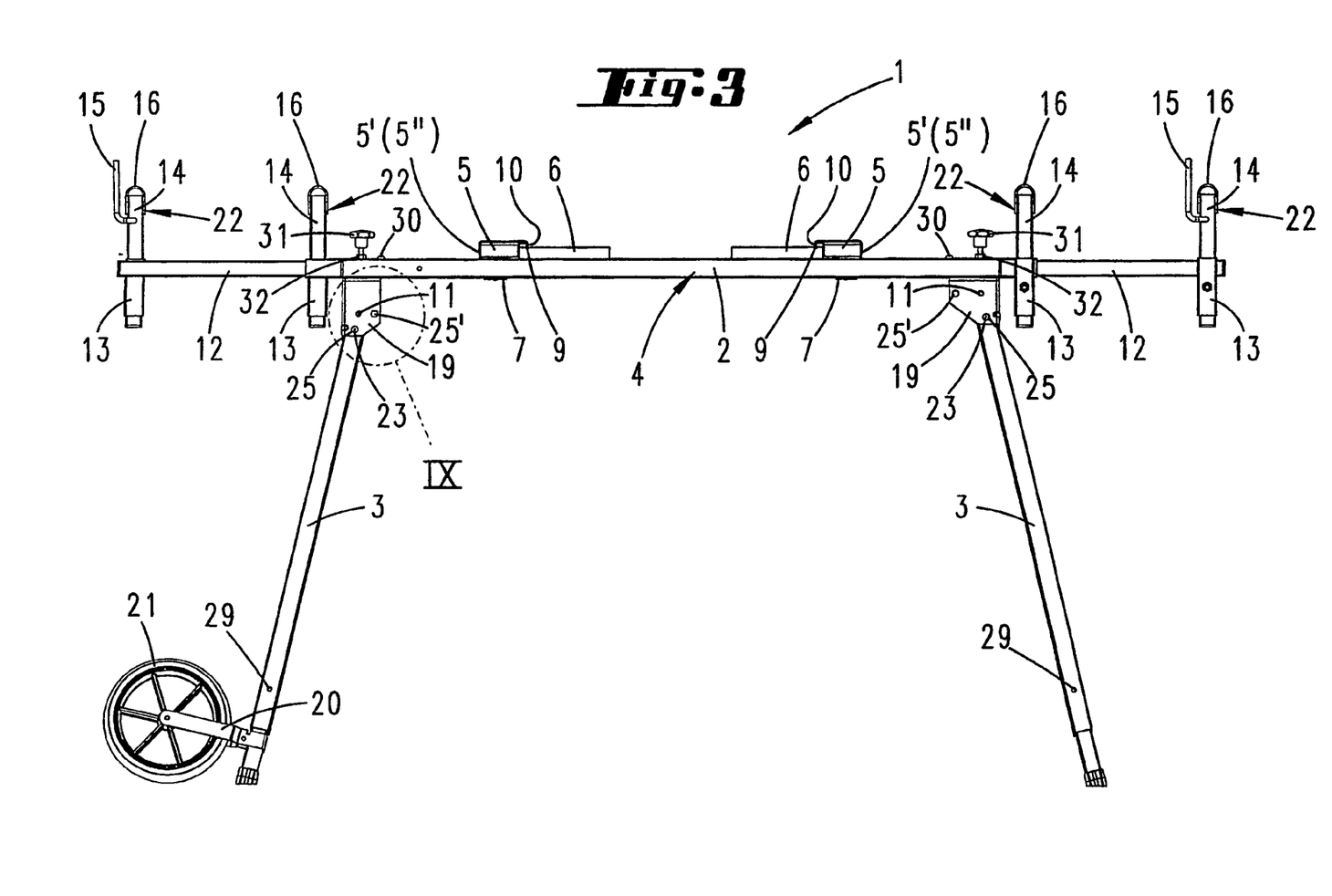
FIG. 3 shows the exemplary embodiment in elevation.
Figure 4:
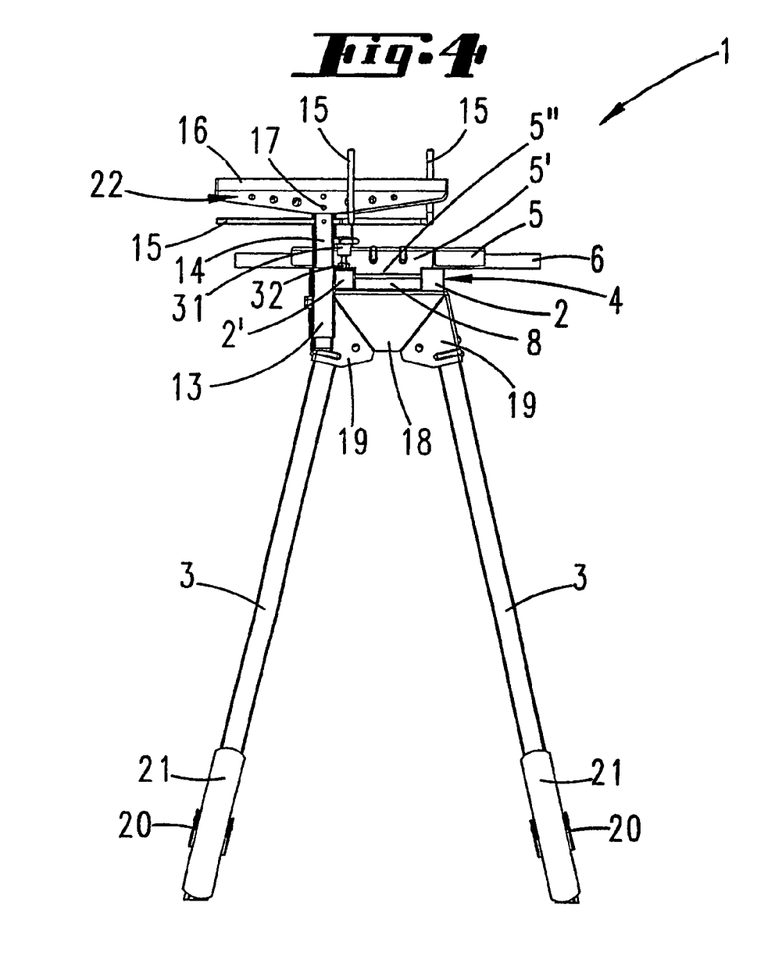
FIG. 4 shows the exemplary embodiment in a side view from the left according to FIG. 3.
Figure 5:
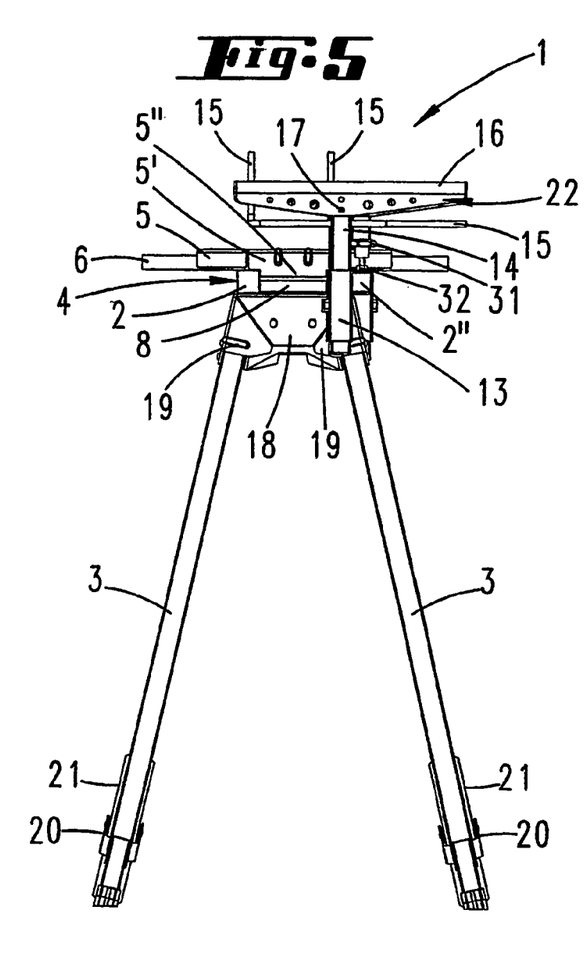
FIG. 5 shows the exemplary embodiment in a side view from the right in FIG. 3.
Figure 6:
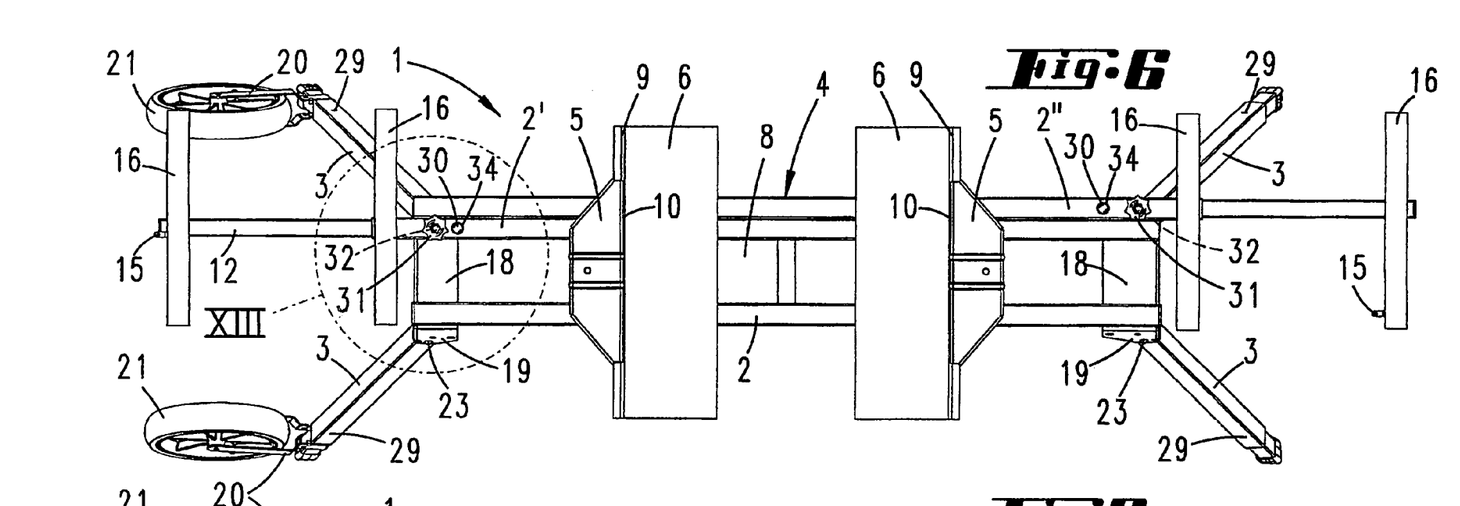
FIG. 6 shows a plan view.
Figure 7:
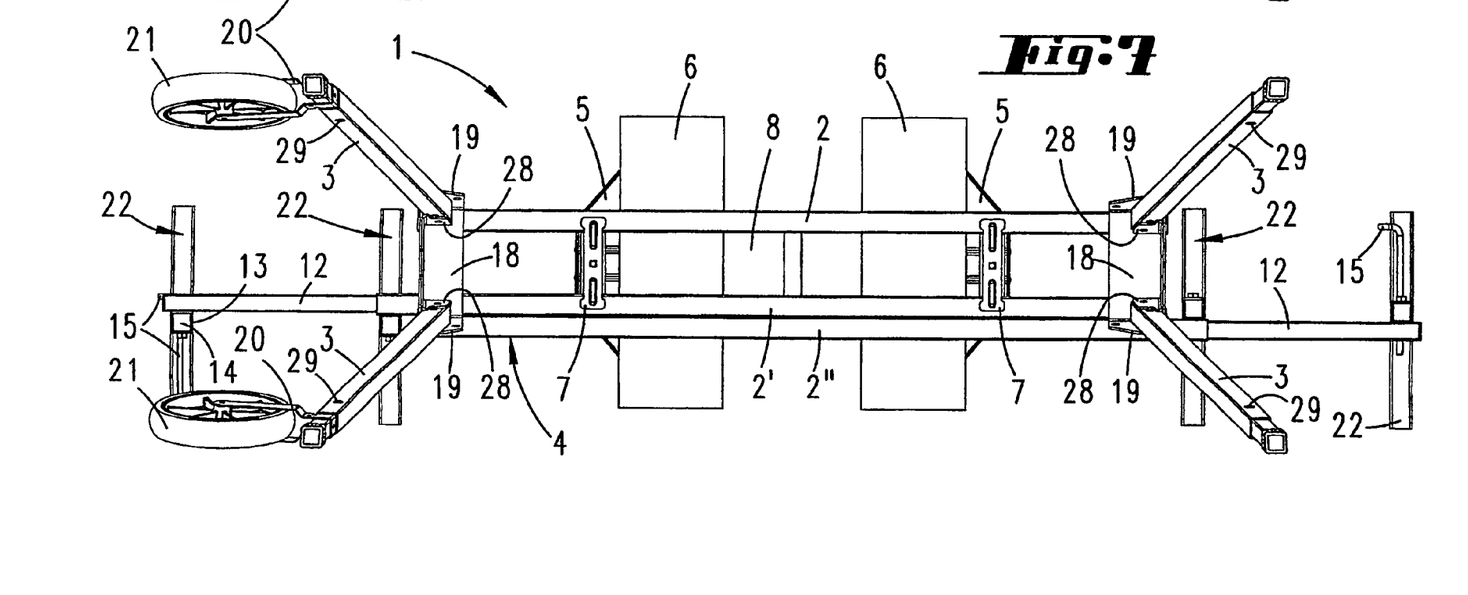
FIG. 7 shows a bottom view.
Figure 8:
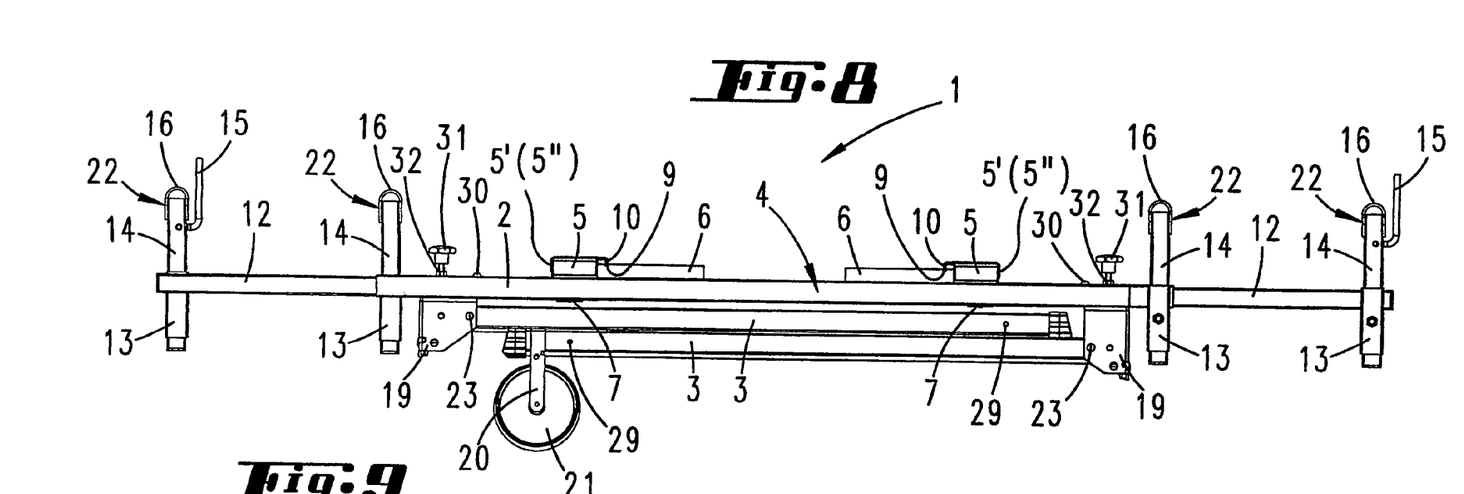
FIG. 8 shows the exemplary embodiment in the folded state.
Figure 9:
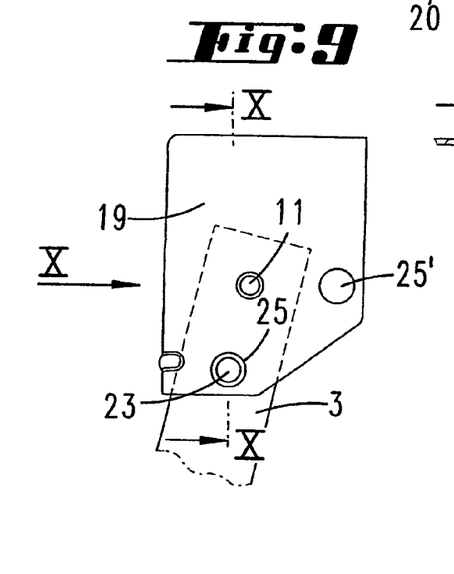
FIG. 9 shows an enlarged illustration of the detail IX from FIG. 3.

The cross-members 18, which are formed by punched and bent parts, form pivot bearings for the legs 3. In the use position, which is shown for example in FIG. 1, the legs 3 have been pivoted out, so that they are located trapezoidally in relation to one another. The length of the legs 3 is less than the distance by which the two cross-members 18 are spaced apart from one another. The cross-members 18 each form leg fastenings 19, which each have a rotary bearing 11 about which in each case a leg 3 can be pivoted. The arrangement of the rotary bearings 11 is selected such that the legs 3, in the folded state, can assume a position in which they are parallel to one another (see FIG. 8). The legs 3 are latched in the respective operating positions, that is to say in the use position (FIG. 1) and the storage position (FIG. 8), by a latching protuberance 23, which is formed by the end of a pin 24. The pin 24 is associated with the leg 3 and can be displaced out of a latching opening 25, 25' by pressure counter to the force of a spring 27. The latching pin 24 is retained in its spring-biased position by a split pin 26.

Figure 10:
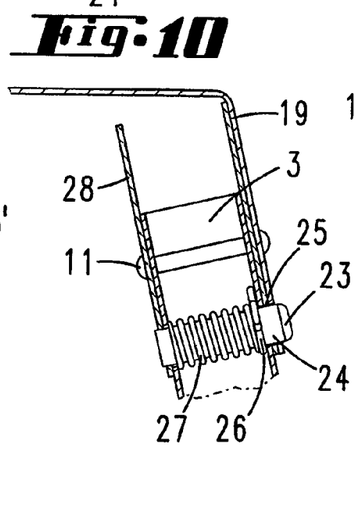
FIG. 10 shows a section along line X-X in FIG. 9.
Figures 11, 12:
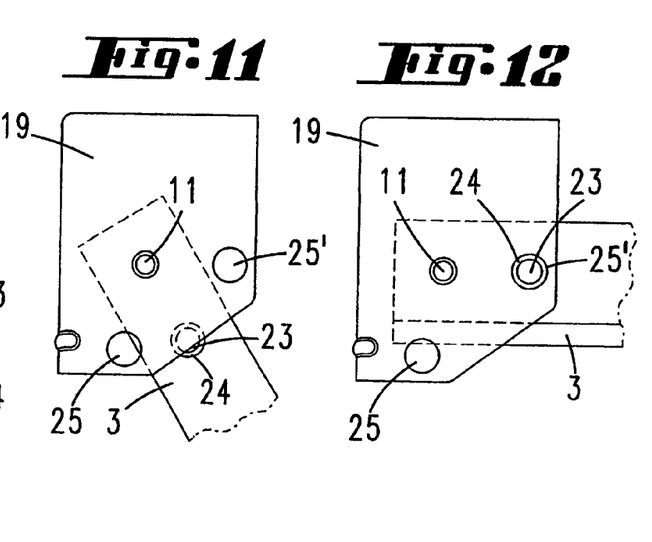
FIG. 11 shows an illustration according to FIG. 9 in a pivoted position.
FIG. 12 shows an illustration according to FIG. 11 in a further-pivoted position.
Figure 13:
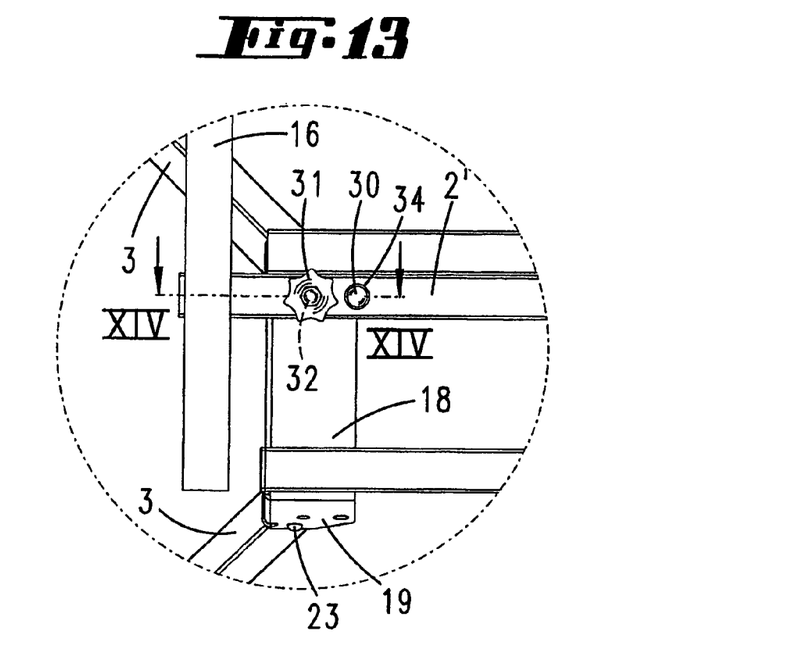
FIG. 13 shows an enlarged illustration of the detail designated XIII in FIG. 6.

As can be gathered from FIG. 10, the pivot axis of the rotary bearing 11 runs obliquely in relation to the horizontal. The pivot axis 11 is formed, on the one hand, by the cross-member 18, or by the leg fastening 19 formed thereby, and, on the other hand, by an inner bearing plate 28, which is likewise formed by a punched and bent part and is located in the inner cavity of the cross-member 18.

One of the two pairs of legs associated with a cross-member 18 in each case has running wheels 21, which are mounted on the respective leg 3 by a fork 20. In the elevated, use position, the running wheels 21 are spaced apart from the underlying surface. In the folded position (FIG. 8), the folded cross-cut saw stand can be transported via these running rollers 21.

The legs 3 are height-adjustable. For this purpose, the legs 3 have inner extension portions. The legs 3, like the frame legs 2, 2', 2", are formed by tubes, namely quadrilateral tubes, and have inner tubes for extension purposes. The inner tubes are fixed to the outer tubes by clamping screws (not illustrated).

The apparatus also functions as follows.

In the storage position, the legs 3 are folded up. They are located parallel to one another and parallel to the frame legs 2. By virtue of the latching protuberances 23 being subjected to pressure actuation, these protuberances can be displaced out of the latching cutouts 25'. The legs 3 can thus be pivoted until the latching protuberances 23 engage in the latching cutouts 25. This operation is carried out for all four legs 3 until the use position illustrated in FIG. 1 has been reached. The cross-cut saw screwed onto the carrying plates 6 can be mounted on the frame together with the carrying plates 6. The brackets 5 provide for the arresting action. Precision adjustment of the position of the cross-cut saw (not illustrated) can take place in that the carrying plates 6, on the one hand, are displaced in the frame interspace 8, together with the brackets 5, in the direction in which the carrying body 4 extends and, on the other hand, transversely to the carrying plates 6.

The height position of the carrying shoulders 16 can be adjusted in the above described manner to the level of the cross-cut saw stand, so that all the carrying shoulders 16 are aligned horizontally with the surface of the cross-cut saw stand.

Reference number 29 illustrates internally threaded screw-in openings in the leg 3. Clamping screws can be screwed into these screw-in openings 29. The end surfaces of the clamping screws press against inner tubes, which can thus be fixed. This makes the height adjustment possible.

Figure 14:
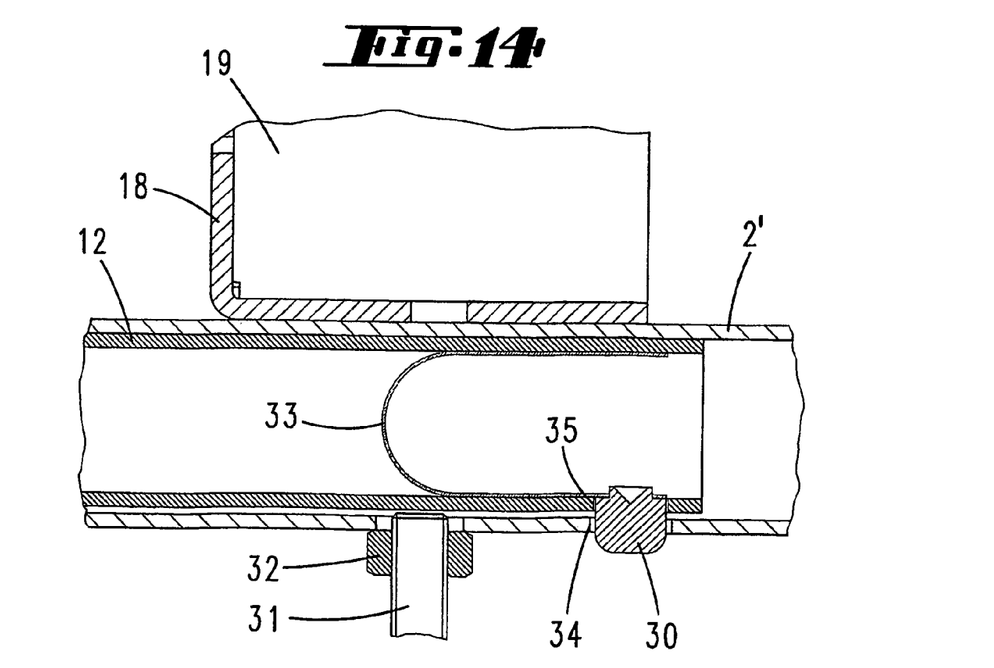
FIG. 14 shows a section along line XIV-XIV in FIG. 13.

It is also possible in this way to secure the extensions 12 in the tubular frames 2, 2', 2". This can be gathered from FIG. 14 in particular. The internal thread into which a clamping screw 31 can be screwed is formed here by a nut 32 welded onto the tube 2'.

In order to prevent the extension 12 from being drawn all the way out of the tube 2', a latching device 30, 33, 34 is provided. This comprises a latching stub 30 which is seated at the end of a leaf spring 33, which is bent in a U-shaped manner. This leaf spring 33 is pushed into the end portion of the quadrilateral tube which forms the extension 12. In this case, the latching stub 30 projects through an opening 35 in the extension 12. The latching stub 30 can latch with the tubular-frame leg 2' by penetrating into an opening 34 there. In order to release the latching, an external pressure has to be exerted on the latching stub 30. The latching stub is thus displaced out of the opening 34. If this is accompanied by the extension 12 being displaced linearly within the tubular leg 2', then the latching stub 30 engages against the inner wall of the tubular-frame leg 2'.

In the same way, it is also possible to provide for latching on the legs 3, in order to prevent the inner tubes from being drawn all the way out of the legs.

All features disclosed are (in themselves) pertinent to the invention. The disclosure content of the associated priority documents (copy of the prior application) is hereby also included in full in the disclosure of the application, also for the purpose of incorporating features of these documents in claims of the present application.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A folding stand for a cross-cut saw or the like, comprising:
    an elongate carrying body having ends on which legs are articulated, the legs being pivotal from a storage position, in which the legs are located generally parallel to the carrying body, into a use position, in which the legs are located trapezoidally in relation to one another, and a securing structure capable of releasably mounting the cross-cut saw on the carrying body, wherein the carrying body comprises a frame and the securing structure comprises brackets interacting with the frame;
    wherein the frame is a tubular frame having spaced-apart elongated horizontal tubular-frame legs defining a longitudinal frame interspace between the tubular-frame legs that extends from an underside of the frame to a top side of the frame, the tubular-frame legs connected at ends to cross-members which provide pivot bearings for the pivotal legs;
    wherein carrying plates positioned on the frame, and on which the cross-cut saw can be fastened, are clamped against the frame by the brackets engaging through the frame interspace from the underside of the frame to the top of the frame and interacting with pressure-exerting strips disposed on the underside of the frame;
    wherein at least two of the tubular-frame legs have extensions which can be drawn telescopically out of the tubular frame legs;
    wherein the extensions have support carriers at free ends which carry height-adjustable workpiece support carriers;
    wherein the workpiece support has a workpiece position stop; and
    wherein the workpiece position stop comprises a wire which is bent at an angle, can be adjusted transversely to a direction in which the extension extends and projects beyond a carrying shoulder, and which is associated in a T-shaped manner with workpiece carriers.

2. The folding stand according to claim 1, wherein the brackets and the pressure-exerting strips have crosspieces or crosspiece portions projecting into the frame interspace.

3. The folding stand according to claim 1, wherein the brackets have an engagement edge engaging in a groove of the carrying plates.

4. The folding stand according to claim 1, wherein the tubular-frame legs are quadrilateral tubular-frame legs.

5. The folding stand according to claim 1, wherein the pivot bearings are configured to allow the tubular-frame legs to be parallel to one another in a folded position.

6. The folding stand according to claim 1, wherein a length of the legs is less than a distance between the cross-members.

7. The folding stand according to claim 1, wherein at least two tubular-frame legs include running wheels, each running wheel mounted to a tubular-frame leg.

8. The folding stand according to claim 7, wherein in the use position, the running wheels are spaced apart from a ground surface.

9. The folding stand according to claim 1, wherein the carrying shoulder has a rounded U-profile which can be tilted stiffly through an angle about a mounting pin on the workpiece carrier.

10. The folding stand according to claim 1, wherein the workpiece carriers are mounted in guide-tube portions.

11. The folding stand according to claim 1, wherein workpiece carriers are disposed at an ends of the carrying body.

12. The folding stand according to claim 1, wherein the pivotal legs are height-adjustable.

13. The folding stand according to claim 1, wherein rollers are associated with the legs and are oriented downward in the storage position.

14. A tool stand, comprising:
a carrying support frame;
a plurality of legs extending downward from the carrying support frame;
at least one frame leg coupled to the carrying support frame, the at least one frame leg having an extension configured to be drawn telescopically out of said frame leg along an extension axis, the extension having an end;
at least one height-adjustable workpiece support carrier coupled to the end of the frame leg, the height-adjustable workpiece support carrier having a workpiece position stop and a carrying shoulder, the workpiece position stop comprising a stop portion bent at an angle, the stop portion extending beyond the carrying shoulder, the stop portion being adjustable along an axis which is transverse to the extension axis;
a tool mounting base positioned on top of the carrying support frame; and
a clamp engaged with the carrying support frame, the clamp having a protruding lip releasably engaged with the tool mounting base;
wherein the clamp further comprises:
(a) an upper clamp portion positioned above the carrying support frame; and
(b) a lower clamp portion positioned below the carrying support frame; and
wherein the clamp is operable to transmit a clamping force which biases the upper and lower clamp portions toward each other.

15. The tool stand of claim 14, wherein the tool mounting base further comprises a recess, and the protruding lip extends into the recess.

16. The tool stand of claim 14, further comprising another clamp engaged with the carrying support frame and having a protruding lip engaged with the tool mounting base, the clamps positioned at opposite ends of the tool mounting base.

17. The tool stand of claim 16, wherein the tool mounting base has first and second recesses in a top surface of the tool mounting base, each protruding lip extending into one of the recesses.

18. The tool stand of claim 14, wherein the tool mounting base comprises a plurality of separate tool mounting base portions.

19. The tool stand of claim 14, wherein the tool mounting base has a width wider than a width of the clamp and the width of the clamp is wider than a width of the carrying support frame.

20. The tool stand of claim 14, wherein:
the carrying support frame further comprises front and back rails separated by an intermediate space; and
the upper clamp further comprises an upper clamp alignment projection extending into the intermediate space.

* * * * *